(12) United States Patent
Wang et al.

(10) Patent No.: US 12,333,232 B2
(45) Date of Patent: Jun. 17, 2025

(54) METHOD AND SYSTEM FOR PROCESSING SIMULATION DATA

(71) Applicant: SHENZHEN GUOWEIXIN TECHNOLOGY CO., LTD, Guangdong (CN)

(72) Inventors: Junjie Wang, Guangdong (CN); Kaipeng Lin, Guangdong (CN); Yanrong Li, Guangdong (CN); Guoyong Huang, Guangdong (CN)

(73) Assignee: SHENZHEN GUOWEIXIN TECHNOLOGY CO., LTD, Guangdong (CN)

( * ) Notice: Subject to any disclaimer, the term of this patent is extended or adjusted under 35 U.S.C. 154(b) by 546 days.

(21) Appl. No.: 17/854,086

(22) Filed: Jun. 30, 2022

(65) Prior Publication Data

US 2022/0343047 A1    Oct. 27, 2022

Related U.S. Application Data

(63) Continuation of application No. PCT/CN2020/081214, filed on Mar. 25, 2020.

(30) Foreign Application Priority Data

Dec. 31, 2019  (CN) .......................... 201911415451.0

(51) Int. Cl.
*G06F 30/343* (2020.01)
*G06F 11/34* (2006.01)
(Continued)

(52) U.S. Cl.
CPC ........ *G06F 30/343* (2020.01); *G06F 30/3308* (2020.01); *G06F 11/3457* (2013.01); *G06F 30/367* (2020.01)

(58) Field of Classification Search
CPC .. G06F 30/343; G06F 30/3308; G06F 30/367; G06F 11/3457
(Continued)

(56) References Cited

U.S. PATENT DOCUMENTS

| 7,480,610 | B2 * | 1/2009 | Scott ..................... G06F 30/331 703/23 |
| 7,869,381 | B1 | 1/2011 | Hatley et al. |

(Continued)

FOREIGN PATENT DOCUMENTS

| CA | 2871868 A1 * | 5/2015 | ......... G06F 17/5027 |
| CN | 101388741 A | 3/2009 | |

(Continued)

OTHER PUBLICATIONS

Wang et al., Chinese Patent Document No. CN-101388741-A, published Mar. 18, 2009, 4 pages including English abstract and 1 drawing. (Year: 2009).*

(Continued)

*Primary Examiner* — Phallaka Kik
(74) *Attorney, Agent, or Firm* — Troutman Pepper Locke LLP; Tim Tingkang Xia, Esq.

(57) ABSTRACT

The present invention discloses a method and system for processing simulation data. The method includes: simultaneously collecting the simulation waveform data of said multiple FPGAs and adding a time stamp to the waveform data of each FPGA collected in each collection period, and storing the waveform data of the multiple FPGAs in the form of a link list according to the time stamp. The technical solution of the present invention can ensure no disorder of the waveform data of multiple FPGAs.

9 Claims, 2 Drawing Sheets

(51) Int. Cl.
*G06F 30/3308* (2020.01)
*G06F 30/367* (2020.01)

(58) Field of Classification Search
USPC ............ 716/106, 111, 136; 703/15; 714/732, 714/741
See application file for complete search history.

(56) References Cited

U.S. PATENT DOCUMENTS

| | | | | |
|---|---|---|---|---|
| 10,073,931 | B2 * | 9/2018 | Havard | ............... G06F 11/3062 |
| 10,380,290 | B1 * | 8/2019 | Rasekh | ................. G06F 30/367 |
| 2015/0143316 | A1 * | 5/2015 | Hosny | ................... G06F 30/392 |
| | | | | 716/113 |
| 2019/0146896 | A1 * | 5/2019 | Berner | .................... G06F 11/36 |
| | | | | 717/134 |

FOREIGN PATENT DOCUMENTS

| | | | | | |
|---|---|---|---|---|---|
| CN | | 105606919 A | * | 5/2016 | ............ G06F 30/20 |
| CN | | 108196358 A | * | 6/2018 | ............ G06F 13/28 |
| CN | | 108616722 A | | 10/2018 | |
| CN | | 109492239 A | | 3/2019 | |
| WO | WO-2006017286 A2 | * | 2/2006 | .......... G06F 11/3636 |

OTHER PUBLICATIONS

Chen et al., Chinese Patent Document No. CN-103560805-A, published Feb. 5, 2014, 3 pages inlcuding English abstract and 1 drawing. (Year: 2014).*
Chen et al., Chinese Patent Document No. CN-105404598-A, published Mar. 16, 2016, 3 pages including English abstract and 1 drawing. (Year: 2016).*
Cai et al., Chinese Patent Document No. CN-108616722-A, published Oct. 2, 2018, 4 pages including English abstract and 1 drawing. (Year: 2018).*
Liu et al., Chinese Patent Document No. CN-109492239-A, published Mar. 19, 2019, 3 pages including English abstract and 1 drawing. (Year: 2019).*
Espacenet, Machine English Translation of Chinese Patent Document No. CN-108196358-A, published Jun. 22, 2018, machine translated on Feb. 8, 2025 by Espacenet. (Year: 2025).*
Zhou, Li-Na, Partitioning and Pin Multiplexing at FPGA-Based Prototyping Platform, 2013., English abstract.
Liu, Yusheng et al., Clock Synchronization Design for Power Plant Control System Based on SoC FPGA Packet Capture, Process Automation Instrumentation, vol. 39, No. 2, 2018, English abstract.
International Search Report of PCT/CN2020/081214, Aug. 28, 2020.

* cited by examiner

METHOD AND SYSTEM FOR PROCESSING SIMULATION DATA

CROSS-REFERENCE TO RELATED PATENT APPLICATION

This application is a continuation application of International Patent Application No. PCT/CN2020/081214, filed on Mar. 25, 2020, which itself claims priority to Chinese Patent Application No. CN201911415451.0 filed in China on Dec. 31, 2019. The disclosures of the above applications are incorporated herein in their entireties by reference.

FIELD OF THE INVENTION

The present invention relates to the field of chip simulation, in particular to a method and system for processing simulation data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When making simulation on a large-scale SOC chip design, we often use multiple FPGAs, so we have to first divide the SOC design, and then make operation on multiple FPGAs. At this time, when collecting waveform data, it is necessary to collect and pool all the waveform data in multiple FPGAs. Thus, the storage and processing method of waveform data is very important, concerning the speed and reliability of system simulation.

In the prior art solution, the method for collecting FPGA waveform data is mainly to store the waveform data in sequence according to the time sequence. With the scale expansion of the SOC, the number of FPGAs also increases, the traditional technical solutions now face more and more problems, such as speed and reliability.

The above technical solution is feasible in the case that the scale of the SOC chip to be simulated is not large. But, with the scale expansion of the SOC chip, the rise in complexity, and the rapid increase in the amount of waveform data, higher requirements are raised on the data transmission bandwidth. While the data bandwidth of a single FPGA can reach more than 3 Gbps, the bandwidth of multiple FPGAs during data collection can reach 3*NGbps. The bandwidth to be processed when pooling waveform data is limited. When multiple FPGAs are not processed in time, the waveform data will be lost or disordered.

SUMMARY OF THE INVENTION

The objective of the present invention is to provide a method for processing simulation data in view of the problem that waveform data is lost or disordered, arising from delay in processing multiple FPGA simulation data in the prior art.

In an embodiment of the present invention, a method for processing simulation data is provided, with the simulation to split a digital product design into multiple FPGAs for synchronous simulation, which comprises:

simultaneously collecting the simulation waveform data of the multiple FPGAs and adding a time stamp to the waveform data of each FPGA collected in each collection period, and storing the waveform data of the multiple FPGAs in the form of a link list according to the time stamp.

In an embodiment of the present invention, the data structure of the link list includes:

TimeStamp+Packet1+Packet2+ . . . +Packet$N$, where, N is a natural number, and each data packet includes the serial number of the FPGA and the waveform data collected corresponding to the time stamp.

In an embodiment of the present invention, before the step of storing the waveform data of the multiple FPGAs, the method further includes the step of performing data compression processing on the waveform data of each FPGA.

In an embodiment of the present invention, a LZ77 compression algorithm is adopted to perform data compression processing on the waveform data of each FPGA.

In an embodiment of the present invention, a system for processing simulation data is further provided, comprising:

multiple FPGAs configured to perform synchronous simulation on multiple parts separated from a digital product design, respectively;

a data collection module configured to simultaneously collect the simulation waveform data of the multiple FPGAs, and adding a time stamp to the waveform data of each FPGA collected in each collection period; and a data storage module configured to store the waveform data of the multiple FPGAs in the form of a link list according to the time stamp.

In an embodiment of the present invention, the data structure of the link list includes:

TimeStamp+Packet1+Packet2+ . . . +Packet$N$, where, N is a natural number, and each data packet includes the serial number of the FPGA and the waveform data collected corresponding to the time stamp.

In an embodiment of the present invention, the system further includes a clock source configured to provide a clock reference for the timestamp generated by the data collection module.

In an embodiment of the present invention, the system further includes a data compression module configured to perform data compression processing on the waveform data of each FPGA.

In an embodiment of the present invention, the data compression module adopts a LZ77 compression algorithm to perform data compression processing on the waveform data of each FPGA.

Compared with the prior art, in the method and system for processing simulation data according to the present invention, we can collect the simulation waveform data of the multiple FPGAs, and add a time stamp to the waveform data of each FPGA collected in each collection period, so as to ensure no disorder of the waveform data of multiple FPGAs by introducing the time stamp synchronization function. We can perform real-time compression on each data stream to reduce the amount of data for subsequent processing. We can manage the compressed data in a link list in the light of the time stamp, facilitating the subsequent searching of data at a specific time point.

DETAILED DESCRIPTION OF EMBODIMENTS

Figure 1:
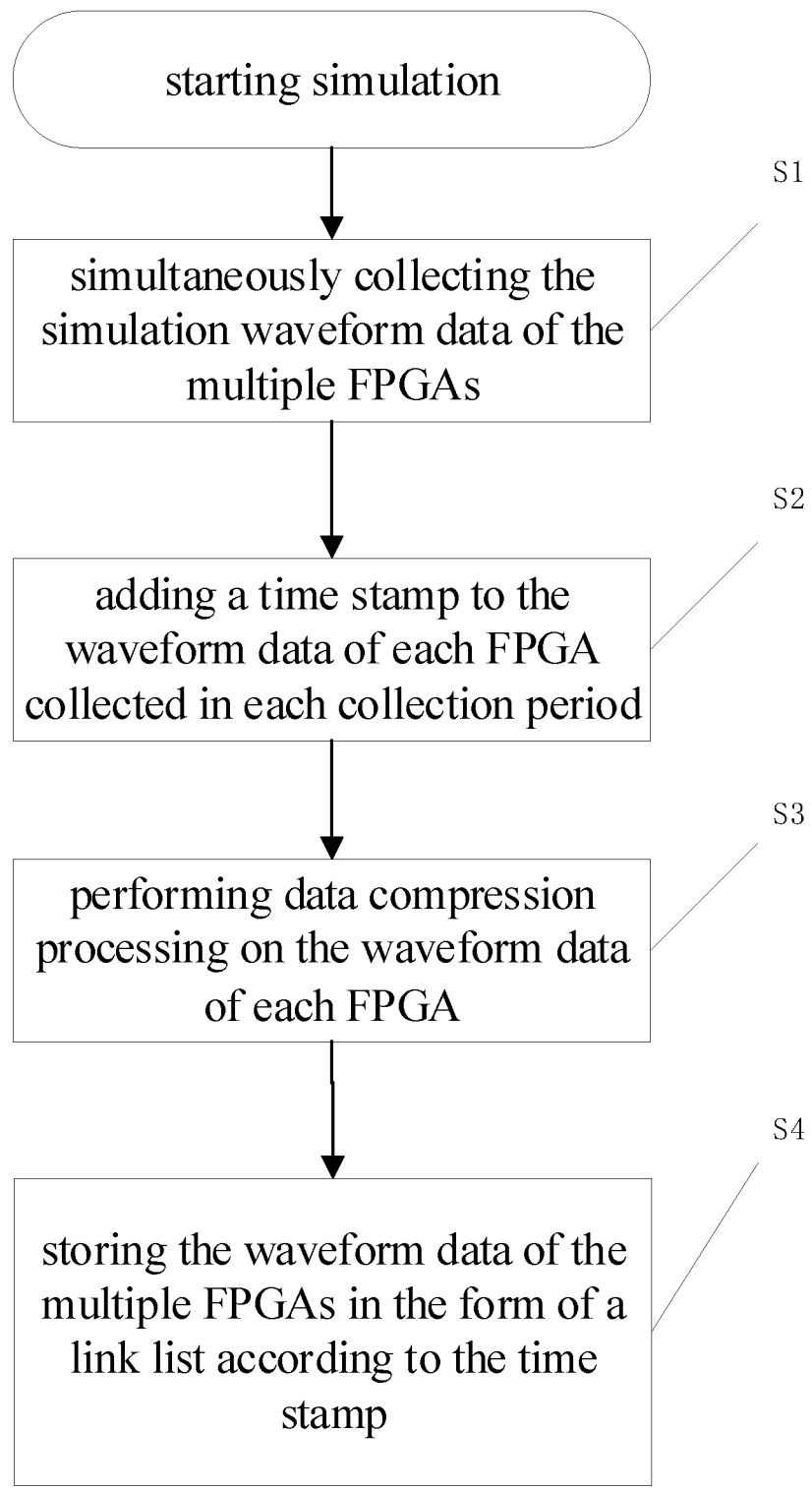
FIG. 1 is a flowchart of the method for processing simulation data according to an embodiment of the present invention.

As shown in FIG. 1, in an embodiment, the present invention provides a method for processing simulation data. The simulation is characterized in that a digital product design (chip design) is split into multiple FPGAs for synchronous simulation, and the method includes steps S1-S4, which will be described below, respectively.

S1: simultaneously collecting the simulation waveform data of the multiple FPGAs.

It should be noted that, since the multiple FPGAs consist of each part of a digital product design, when the digital product design is simulated, a synchronous simulation operation is made on the multiple FPGAs. Therefore, only in the case that the simulation waveform data of the multiple FPGAs must be collected synchronously, the accuracy and integrity of the simulation waveform data can be guaranteed.

S2: adding a time stamp to the waveform data of each FPGA collected in each collection period.

It should be noted that, when the simulation waveform data of the multiple FPGAs is collected, usually, after the simulation waveform data of a period of time was collected, the simulation waveform data of the period of time is packaged and stored. After the waveform data of one FPGA has been collected, a timestamp is added to the waveform data packet of the FPGA, so that the synchronization of the simulation waveform data of the multiple FPGAs can be guaranteed.

S3: performing data compression processing on the waveform data of each FPGA.

It should be noted that, the digital product design has usually a long simulation process, and the simulation data needs to be recorded in real time with very large generated simulation waveform data, so it takes up a lot of storage space if it is stored directly. Therefore, it is necessary to compress the recorded simulation waveform data. We assess the compression algorithm in term of three performance indicators: compression rate, throughput rate, hardware cost, and real-time performance. The LZ77 compression algorithm has the best among several performance indicators. Therefore, in the embodiment of the present invention, the LZ77 compression algorithm is used to compress the simulation waveform data into data packets.

S4: storing the waveform data of the multiple FPGAs in the form of a link list according to the time stamp.

Figure 2:
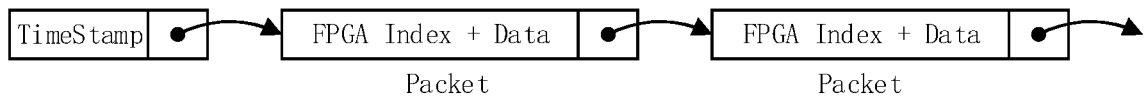
FIG. 2 is a structure diagram of the waveform data link list according to an embodiment of the present invention.

Specifically, as shown in FIG. 2, the data structure of the link list includes:

TimeStamp+Packet1+Packet2+ . . . +PacketN.

Where, N is a natural number, and each data packet (Packet) includes the serial number (FPGA Index) of the FPGA and the waveform data (Data) collected corresponding to the time stamp (TimeStamp).

In the above data structure, the time stamp can ensure the synchronization of waveform data collected in each collection period. The data of each FPGA forms a data packet, and then each data packet is organized by a link list for easy storage and query.

Figure 3:
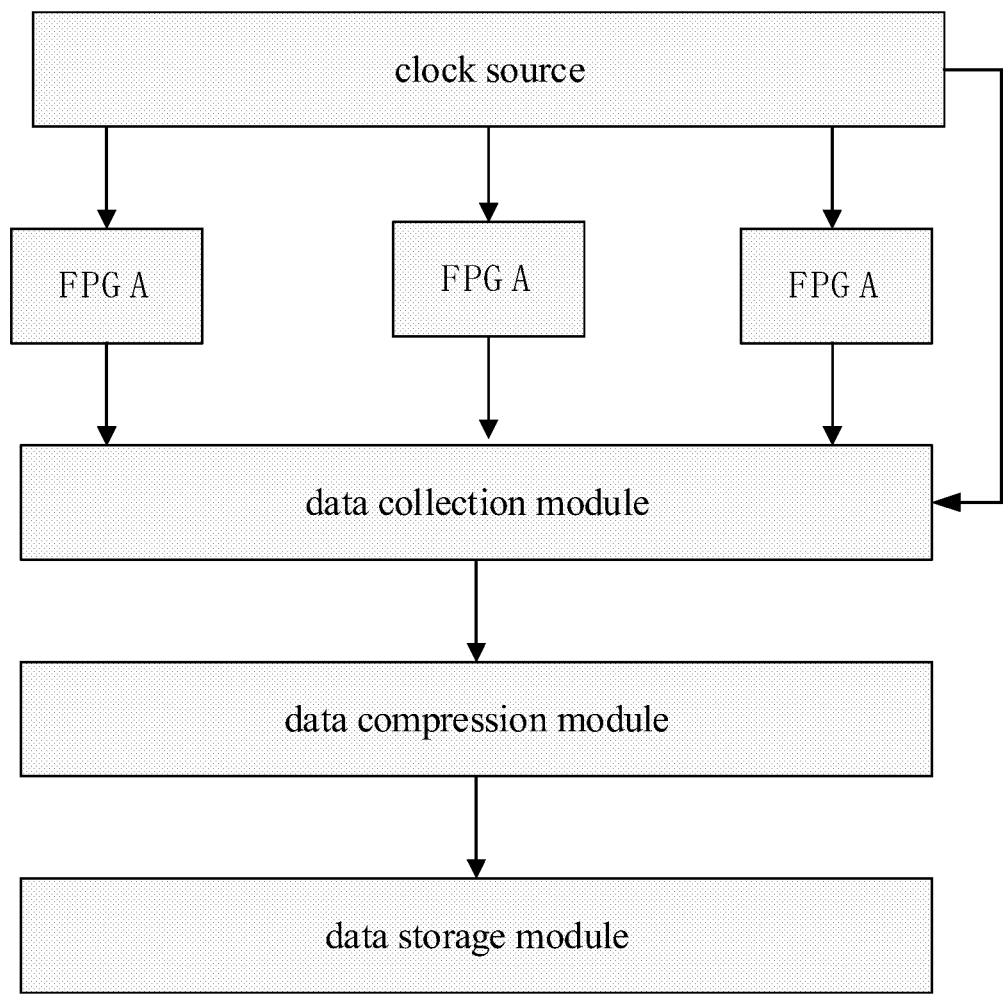
FIG. 3 is a structure diagram of the system for processing simulation data according to an embodiment of the present invention.

As shown in FIG. 3, corresponding to the above method for processing simulation data, an embodiment of the present invention further provides a system for processing simulation data, which includes multiple FPGAs, a clock source, a data collection module, a data compression module and a data storage module.

The multiple FPGAs are configured to perform synchronous simulation on multiple parts separated from a digital product design, respectively.

The data collection module is configured to simultaneously collect the simulation waveform data of the multiple FPGAs, and adding a time stamp to the waveform data of each FPGA collected in each collection period.

The clock source is configured to provide a clock reference for the timestamp generated by the data collection module.

The data compression module is configured to perform data compression processing on the waveform data of each FPGA. The data compression module adopts the LZ77 compression algorithm to perform data compression processing on the waveform data of each FPGA.

The data storage module is configured to store the waveform data of the multiple FPGAs in the form of a link list according to the time stamp.

It should be noted that, since the simulation data processing system is based on the same concept as the method for processing simulation data, the information interaction, the execution process and the resultant technical effects between each module have the same descriptions as those in the method for processing simulation data, so they will not repeated here.

In summary, the method and system for processing simulation data according to the present invention enable to collect the simulation waveform data of the multiple FPGAs, and add a time stamp to the waveform data of each FPGA collected in each collection period, so as to ensure no disorder of the waveform data of multiple FPGAs by introducing the time stamp synchronization function; perform real-time compression on each data stream to reduce the amount of data for subsequent processing; and manage the compressed data in a link list in the light of the time stamp, facilitating the subsequent searching of data at a specific time point.

The above are only the preferred specific embodiments of the invention, but the invention is not limited thereto. Any modifications, equivalent replacements and improvements made within the spirit and principles of the present invention, shall fall within the protection scope of the invention.

What is claimed is:

1. A method for processing simulation data with the simulation to split a digital product design into multiple FPGAs for synchronous simulation, which comprises:
    simultaneously collecting the simulation waveform data of said multiple FPGAs and adding a time stamp to the waveform data of each FPGA collected in each collection period, and
    storing the waveform data of said multiple FPGAs in the form of a link list according to said time stamp.

2. The method for processing simulation data according to claim 1, wherein the data structure of said link list includes:

TimeStamp+Packet1+Packet2+ . . . +PacketN, where, N is a natural number, and each data packet includes the serial number of the FPGA and the waveform data collected corresponding to said time stamp.

3. The method for processing simulation data according to claim 1, wherein before the step of storing the waveform data of said multiple FPGAs, said method further includes the step of performing data compression processing on the waveform data of each FPGA.

4. The method for processing simulation data according to claim 3, wherein a LZ77 compression algorithm is adopted to perform data compression processing on the waveform data of each FPGA.

5. A system for processing simulation data, comprising:
multiple FPGAs configured to perform synchronous simulation on multiple parts separated from a digital product design, respectively;
a data collection module configured to simultaneously collect the simulation waveform data of said multiple FPGAs, and adding a time stamp to the waveform data of each FPGA collected in each collection period; and
a data storage module configured to store the waveform data of said multiple FPGAs in the form of a link list according to said time stamp.

6. The system for processing simulation data according to claim 5, wherein
the data structure of said link list includes:

TimeStamp+Packet1+Packet2+ . . . +Packet$N$, where, N is a natural number, and each data packet includes the serial number of the FPGA and the waveform data collected corresponding to said time stamp.

7. The system for processing simulation data according to claim 5, wherein said system further includes a clock source configured to provide a clock reference for the timestamp generated by said data collection module.

8. The system for processing simulation data according to claim 5, wherein said system further includes a data compression module configured to perform data compression processing on the waveform data of each FPGA.

9. The system for processing simulation data according to claim 8, wherein said data compression module adopts a LZ77 compression algorithm to perform data compression processing on the waveform data of each FPGA.

* * * * *